United States Patent [19]

Davies

[11] 4,405,740

[45] Sep. 20, 1983

[54] POLYARYLENE SULPHIDE COMPOSITIONS

[75] Inventor: Glyndwr J. Davies, Southall, England

[73] Assignee: The Glacier Metal Company Limited, Middlesex, England

[21] Appl. No.: 355,741

[22] PCT Filed: Jul. 2, 1981

[86] PCT No.: PCT/GB81/00127

§ 371 Date: Mar. 3, 1982

§ 102(e) Date: Mar. 3, 1982

[87] PCT Pub. No.: WO82/00153

PCT Pub. Date: Jan. 21, 1982

[30] Foreign Application Priority Data

Jul. 4, 1980 [GB] United Kingdom ................. 8022066

[51] Int. Cl.$^3$ ............................................. G08K 5/09
[52] U.S. Cl. ................................... 524/287; 156/327;
427/393.5; 427/400; 428/419; 524/293;
524/294; 524/299
[58] Field of Search ............... 524/293, 294, 299, 287;
156/327; 427/393.5, 400; 428/419

[56] References Cited

U.S. PATENT DOCUMENTS 3,354,129 11/1967 Edmonds, Jr. et al. ............. 260/79
4,247,598 1/1981 Blackwell .......................... 428/484

FOREIGN PATENT DOCUMENTS 1513378 6/1978 United Kingdom .

Primary Examiner—Melvyn I. Marquis
Attorney, Agent, or Firm—Oblon, Fisher, Spivak, McClelland & Maier

[57] ABSTRACT

A composition comprising an intimate mixture of a polyarylene sulphide with an aryl ester of an aryl alcohol, the ester being in the liquid phase and the resin being a wet powder mixture, in suspension, in solution or in the form of a paste. The preferred mixture comprises polyphenylene sulphide and benzyl benzoate. There is also described a method of curing polyphenylene sulphide comprising dissolving the polyphenylene sulphide in benzyl benzoate and heating the solution so that the benzyl benzoate evaporates and the polyphenylene sulphide cures simultaneously.

7 Claims, No Drawings

POLYARYLENE SULPHIDE COMPOSITIONS

The present invention relates to polyarylene sulphide compositions.

Polyarylene sulphides have properties which make them suitable for use in various situations, for example as plain bearing linings. However, they also possess properties which make their preparation and application inconvenient and frequently difficult.

Available techniques involve the use of toxic chemicals or techniques involving what is essentially powder fusion. The powder fusion techniques limit the roles in which polyarylene sulphides can be used and involve slow processes of low productivity.

One of the properties of polyarylene sulphides which limits their use is their high viscosities in the molten state. This renders the distribution of the material difficult in the extreme and makes it difficult therefore to establish a bond between the polyarylene sulphide and another material. One known method of forming a bond between the polyarylene sulphide and another material is to apply the polyarylene sulphide powder to the other material as level and evenly as possible, and then to melt, cure and cross-link the powder. Water based dispersions of PPS are also known but this is just another form of applying powder since this is what remains after the water has been evaporated.

However, as stated above, using polyarylene sulphide powder involves considerable manufacturing difficulties. Polyphenylene sulphide takes a long time to cure and crosslink particularly when the powder layer is relatively thick. Also since the molten powder has a high viscosity and generally does not flow or wet a surface very well, this results in voids and consequently a poor bond between the polyphenylene sulphide and the other material which bond may fail when under load.

It is also difficult to achieve a precision thickness of polyarylene sulphide which is dimensionally stable and even more difficult to produce a very thin, cured layer.

It is an object of the present invention to provide polyarylene sulphide in a workable form in order to minimise the above difficulties in its use.

The present invention is based on the discovery that benzyl benzoate has a solvent action on polyphenylene sulphide.

According to the present invention a composition of matter comprises polyarylene sulphide intimately admixed with an aryl ester of an aryl alcohol the ester being in the liquid phase, and the resin being in solution and/or in suspension therein.

Thus the mixture may be a two phase mixture of a resin or a resin rich phase comprising polyarylene sulphide and a solvent or a solvent rich phase comprising an aryl ester of an aryl alcohol preferably benzyl benzoate; alternatively, the resin may be in solution in the solvent.

The resin phase may further include other resins besides polyarylene sulphide in either a major or minor proportion based on the polyarylene sulphide. Such other resins may include polytetrafluoroethylene, polyimides and polysulphones. The resin phase may also include fillers, pigments, dyes, surface active additives, stabilizers, cross linking agents, coating aids such as silica or titanium oxide powders, and bases to enhance bonding.

The solvent phase may include or comprise mixtures of aryl esters of aryl alcohols, for example one or more of benzyl benzoate, benzyl phthalate, benzyl isophthalate, and benzyl terephthalate, and other materials acting as diluents or extenders or viscosity reducers for the active solvent and having no non-solvent action such as to prevent the blend having the necessary plasticiser or solvent action for the resin phase as the case may be.

The solvent phase may also include co-solvents which whilst having no significant solvent action on their own enhance the solvent action of the benzyl benzoate.

The solvent phase may also include other solvents for polyphenylene sulphide and when the resin phase includes other resins, solvents for such other resins even if these are not solvents for polyphenylene sulphide though in this case they are preferably miscible with benzyl benzoate to form a single solvent phase.

The compositions of the invention may extend from slurries of polyphenylene sulphide plasticized or not by benzyl benzoate in liquid vehicles which contain benzyl benzoate the benzyl benzoate either being in the polyphenylene sulphide or in the liquid vehicle or in both, to pastes of polyphenylene sulphide plasticized or not with benzyl benzoate suspended or dissolved in benzyl benzoate or benzyl benzoate containing vehicles or spreadable, dippable or sprayable solutions of polyphenylene sulphide in benzyl benzoate or benzyl benzoate containing solvents.

The polyarylene sulphide resin that can be used in the present invention may be a polymer made by the method disclosed in USP 3354129 but in general can be represented as a polymer including a recurring unit of the formula

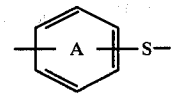

in which the ring A may be substituted.

One such form of substitution may be represented by the formula

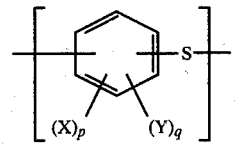

in which:

X represents a fluorine, chlorine, bromine or iodine atom, preferably chlorine or bromine, and Y represents a hydrogen atom,

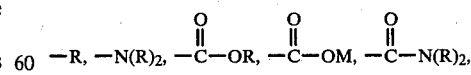

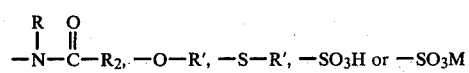

groups in which:

R represents a hydrogen atom, an alkyl, cycloalkyl, aryl, aralkyl, or alkaryl group containing 1 to 12 carbon atoms and in which:

M represents an alkali metal atom of a sodium or potassium atom and in which:

p is 0 to 4 and q is 2 to 4.

Polyphenylene sulphide in which the repeat unit can be represented by the formula

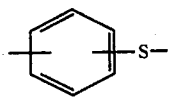

is preferred.

The polyarylene sulphides may be partially oxidized or may have a branched or cross linked structure though non-cross linked polymers or ones having a low degree of cross linking and thus relatively low M.W. are preferred e.g. those having M.W.'s in the range 17,500 to 5000. More generally polyarylene sulphides having melting points in the range 280° C. to 300° C. are preferred. Also materials having intrinsic viscosities in chloronapthalene at 260° C. of at least 0.1, e.g. 0.1 to 0.3 especially 0.13 to 0.23 are preferred.

Polyphenylene sulphide has a solubility parameter of 8.5 to 9.5. Uncured PPS sold under the Trade Mark Ryton VI has a melt flow index of 1000 g/min. by the American Society Test Method (ASTM, D1238). Using the same test, part cured PPS sold under the Trade Marks Ryton P2 and P3 have melt flow indices of 300 and 125 g/min. respectively. In those compositions including PPS in particulate form the particle size may be in the range 10–200 microns and use of powder of such particle size is convenient as a starting point for the preparation of single phase systems in accordance with the invention.

The preferred solvent compounds for use in the present invention may be represented by the formula

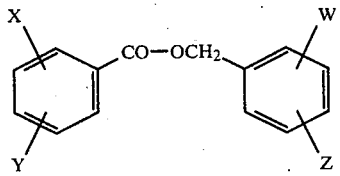

where X, Y, W and Z represent a hydrogen atom or a halogen atom e.g. a chlorine atom.

The most preferred compound is Compound I, when X, Y, W and Z are all hydrogen. A less preferred compound is Compound I when W or Z is chlorie and X, Y and Z or W are hydrogen, namely benzyl monochlorobenzoate.

Benzyl benzoate has the following properties:-
melting point 18°–20° C.
boiling point 320° C.
solubility parameter 9.3

Other solvent compounds which may be used in the present invention may comprise phenyl benzoate, diphenyl phthalate, di-benzyl ether, benzoic anhydride and di-phenyl sulphone.

Using a composition according to the invention a preferred method of curing the polyarylene sulphide comprises mixing polyarylene sulphide with an aryl ester of an aryl alcohol, arranging the conditions affecting the mixture so that the components form a single continuous liquid phase, and subsequently evaporating the ester, and at least partly curing the polyarylene sulphide simultaneously to leave the polyarylene sulphide in an at least partly cured state.

Preferably the polyarylene sulphide is polyphenylene sulphide and preferably the ester is benzyl benzoate.

Thus, the ester may be in the liquid state so that the mixture may be a paste or slurry of resin in the ester or may be a solution of the resin in ester, and the components are preferably heated until they form one continuous liquid phase. The liquid may be cooled at this stage for example in order to promote precipitation of the resin in the form of fine crystals in the ester.

This step is not absolutely necessary in all cases but may be advantageous for example if it is desired to store the formulation for any length of time.

Preferably the nature of the ester and the resin are such that when the mixture is heated the resin and ester form a single phase and as the ester evaporates, the resin undergoes curing. Preferably the ester does not evaporate completely until the resin is almost completely cured. Preferably a minimum of ester is employed since this may be lost in evaporation.

The method according to the invention may therefore render it possible to produce a cured polyarylene sulphide in the form of a thin film having a thickness hitherto thought to be unobtainable for example as low as from 1 to $4 \times 10^{-6}$ m, for example $3 \times 10^{-6}$ m.

Various methods may be employed in applying the mixture prior to curing. In the case of a paste or wet powder this may be applied for example by wet spraying e.g. by an aerosol or spreading while in the case of slurries and solutions these may be applied by wet spraying or by painting or the article to which the resin is to be applied may be dipped into the mixture.

The invention also extends to the use of the ester in welding together surfaces of the resin. By applying the ester to two resin surfaces to be joined together and holding these together at a suitable pressure and temperature, an effective bond may be achieved.

The invention may be carried into practice in various ways and will be illustrated in the following specific examples. All percentages in the following examples are by weight.

Examples 1 to 18 are examples of mixtures in accordance with the invention which are applied to an aluminium alloy backing in order to coat the backing with polyphenylene sulphide. Example 19 is an example of solvent welding.

EXAMPLE 1

8% uncured polyphenylene sulphide sold under the Trade Mark Ryton VI was mixed with 92% benzyl benzoate. The mixture was heated to a temperature in the range 250° to 290° C. by which time the polyphenylene sulphide had dissolved in the benzyl benzoate. The backing, at ambient temperature, was immersed for 0.5 seconds and withdrawn. A coating of solution had adhered to the backing. The coated backing was transferred to an air circulatory oven and maintained at a temperature between 300° and 310° C. for five minutes. The temperature was then increased to a temperature between 370° and 380° C. for a further 15 minutes after which time the benzyl benzoate had evaporated and the polyphenylene sulphide was fully cured. The layer of polyphenylene sulphide produced was approximately 0.001 cm in thickness.

EXAMPLE 2

30% uncured polyphenylene sulphide were dissolved in a solution comprising 10% diphenyl phthalate and 60% benzyl benzoate and held at a temperature between 250° and 290° C. The backing was immersed in the solution for 2 minutes thus allowing the backing and solution to reach a thermal equilibrium. The backing, with an adherent coating of solution, was transferred to an oven and heated to a temperature between 300° and 310° C. for five minutes and then to a temperature between 370° and 380° C. for a further 15 minutes. A coating similar to that obtained in Example 1 was obtained.

EXAMPLE 3

A suspension of uncured polyphenylene sulphide was prepared by mixing 30% polyphenylene sulphide with 10% diphenyl phthalate and 60% benzyl benzoate, heating the mixture to a temperature between 250° and 290° C. in order to dissolve the polyphenylene sulphide, and subsequently cooling the solution to a room temperature while maintaining the vigorous agitation. A fine cloudy gelatinous suspension of polyphenylene sulphide was thus formed. The suspension was sprayed on to two backings, one of which was at room temperature and the other of which was heated to about 250° C. The sprayed backings were transferred to an oven where they were held at a temperature between 300° and 310° C. for five minutes and then held at a temperature between 370° and 380° C. for a further 15 minutes. An adherent coating of polyphenylene sulphide 0.001 cm thick was produced on each.

EXAMPLE 4

A water-based slurry was produced by ball milling together for 24 hours 30% uncured polyphenylene sulphide, 49% saturated calcium hydroxide solution, 1% of a nonionic surfactant (as sold under the Trade Mark Triton X 100) and 20% diphenyl sulphone. This slurry was used to spray coat two backings as described in Example 3 above and similar coatings were obtained.

EXAMPLE 5

A backing, at room temperature, was sprayed with a solution comprising 10% phenyl benzoate in 90% benzyl benzoate until the surface sprayed was fully wet but not dripping. The wetted surface was sprayed electrostatically with a powder mixture of 99% polyphenylene sulphide and 1% calcium hydroxide. The backing was placed in an oven and heated to a temperature of between 300° and 310° C. for 5 minutes followed by being heated to a temperature between 370° and 380° C. for a further 15 minutes. As in the previous examples a satisfactory thin coating was obtained.

EXAMPLE 6

This was carried out in the same way as Example 5 but with diphenyl phthalate replacing phenyl benzoate. Similar results were obtained as those of Example 5.

EXAMPLE 7

This was carried out in the same way as Example 4 but the calcium hydroxide solution was replaced with an aqueous suspension of polytetrafluoroethylene comprising between 15 and 30% polytetrafluoroethylene. Similar results were obtained to those of Example 4.

EXAMPLE 8

The following ingredients were mixed intimately in a high speed mixer: 70% uncured polyphenylene sulphide, 20% diphenyl sulphone, 9% diphenyl phthalate and 1% calcium hydroxide. The mixture was electrostatically sprayed on to a backing, at room temperature. The backing was placed in an oven where it was heated to a temperature between 300° and 310° C., held at that temperature for 5 minutes and subsequently raised to a temperature between 370° and 380° C. for 15 minutes. An adherent coating of polyphenylene sulphide was obtained having a thickness of 0.001 cm approximately.

EXAMPLE 9

This was carried out in the same way as Example 8 except that the backing was at a temperature between 350° and 370° C. prior to its being sprayed with the mixture. Similar results were obtained to those of Example 8.

EXAMPLE 10

This was carried out in the same way as example 1 but with the uncured polyphenylene sulphide replaced by 99% part cured polyphenylene sulphide (sold under the Trade Mark Ryton P2) and 1% calcium hydroxide powder. Similar results were obtained to those obtained in example 1 but it was found that the curing time was shorter than in example 1.

EXAMPLE 11

This was carried out in the same way as example 2 but an uncured polyphenylene sulphide was replaced by a mixture of 99% part cured polyphenylene sulphide and 1% calcium hydroxide, and the diphenyl phthalate/benzyl benzoate mixture was replaced by benzyl benzoate alone. Similar results were obtained to those of example 2 but it was found that the curing time was shorter than in example 2.

EXAMPLE 12

This was carried out in the same way as example 3 but the uncured polyphenylene sulphide was replaced by a mixture of 99% part cured polyphenylene sulphide and 1% calcium hydroxide, and the diphenyl phthallate/benzyl benzoate mixture was replaced by benzyl benzoate alone. Similar results were obtained to those in example 3 but it was found that the curing time was shorter than in example 3.

EXAMPLE 13

This was carried out in the same way as example 4 but the uncured polyphenylene sulphide was replaced entirely by part cured polyphenylene sulphide. Similar results were obtained to those obtained in example 4 but it was found that the curing time was shorter than in example 4.

EXAMPLE 14

This was carried out in the same way as example 5 but the uncured polyphenylene sulphide was replaced entirely by part cured polyphenylene sulphide. Similar results were obtained to those obtained in example 5 but it was found that the curing time was shorter than in example 5.

EXAMPLE 15

This was carried out in the same way as example 6 but the uncured polyphenylene sulphide was replaced entirely by part cured polyphenylene sulphide. Similar results were obtained to those obtained in example 6 but it was found that the curing time was shorter than in example 6.

EXAMPLE 16

This was carried out in the same way as example 7 but the uncured polyphenylene sulphide was replaced by a mixture of 99% part cured polyphenylene sulphide and 1% calcium hydroxide. Similar results were obtained to those obtained in Example 7 but it was found that the curing time was shorter than in Example 7.

EXAMPLE 17

This was carried out in the same way as Example 8 but the uncured polyphenylene sulphide was replaced entirely by part cured polyphenylene sulphide. Similar results were obtained to those obtained in Example 8 but it was found that the curing time was shorter than in Example 8.

EXAMPLE 18

This was carried out in the same way as Example 9 but the uncured polyphenylene sulphide was replaced entirely by part cured polyphenylene sulphide. Similar results were obtained to those obtained in Example 9 but it was found that the curing time was shorter than in Example 9.

EXAMPLE 19

Two blocks of injection moulded polyphenylene sulphide were bonded together by wetting each mating surface with benzyl benzoate and then clamping together under a pressure of 100 psi, $6.9 \times 10^5$ N/m$^2$ and heating for 10 minutes at 300° C.

I claim:

1. A composition of matter comprising a polyarylene sulphide having a molecular weight of between 5,000 and 17,500 intimately admixed with an aryl ester of an aryl alcohol in an amount sufficient to solvate said polyarylene sulphide.

2. The composition of claim 1 wherein said polyarylene sulphide is polyphenylene sulphide.

3. The composition of claim 1 wherein said ester is benzyl benzoate.

4. The composition of claim 1 wherein the mixture is in the form of a paste.

5. The composition of claim 1 wherein the mixture is a two-phase mixture comprising a resin-rich phase and a solvent-rich phase.

6. A method of curing a polyarylene sulphide from the composition of claim 1 comprising: mixing the components to form a single continuous liquid phase under conditions suitable for obtaining said single phase; and
    subsequently evaporating said ester while simultaneously at least partially curing said polyarylene sulphide.

7. The method of claim 6 wherein two solid surfaces of polyarylene sulphide are welded together by wetting said surfaces with said ester and clamping them together prior to the evaporation of said ester.

* * * * *